(12) United States Patent
Martelli

(10) Patent No.: US 9,755,494 B1
(45) Date of Patent: Sep. 5, 2017

(54) HYBRID MAGNETIC ENGINE/GENERATOR APPARATUS AND METHOD

(71) Applicant: John D. Martelli, Pensacola, FL (US)

(72) Inventor: John D. Martelli, Pensacola, FL (US)

( * ) Notice: Subject to any disclaimer, the term of this patent is extended or adjusted under 35 U.S.C. 154(b) by 371 days.

(21) Appl. No.: 14/683,858

(22) Filed: Apr. 10, 2015

Related U.S. Application Data

(60) Provisional application No. 61/978,386, filed on Apr. 11, 2014.

(51) Int. Cl.
| | |
|---|---|
| *H02K 33/00* | (2006.01) |
| *H02K 47/04* | (2006.01) |
| *H02K 15/03* | (2006.01) |
| *H02K 1/17* | (2006.01) |
| *H02K 1/22* | (2006.01) |
| *H02K 1/24* | (2006.01) |
| *H02K 13/00* | (2006.01) |
| H02K 53/00 | (2006.01) |

(52) U.S. Cl.
CPC .............. *H02K 47/04* (2013.01); *H02K 1/17* (2013.01); *H02K 1/223* (2013.01); *H02K 1/24* (2013.01); *H02K 13/006* (2013.01); *H02K 15/03* (2013.01); *H02K 53/00* (2013.01); *Y10S 74/09* (2013.01)

(58) Field of Classification Search
CPC ........ H02K 7/075; H02K 33/16; H02K 33/12; H02K 7/1884; H02K 7/1876; H02K 7/06
USPC .............................. 310/14–15, 20, 23–24, 46
See application file for complete search history.

(56) References Cited

U.S. PATENT DOCUMENTS

| | | | | |
|---|---|---|---|---|
| 3,942,913 A | * | 3/1976 | Bokelman | F01B 1/0644 310/24 |
| 2009/0250940 A1 | * | 10/2009 | Urban | H02K 53/00 290/1 A |
| 2010/0308601 A1 | * | 12/2010 | Walden | H02K 53/00 290/1 R |
| 2012/0010082 A1 | * | 1/2012 | Vaucher | H02K 55/00 505/163 |
| 2013/0005579 A1 | * | 1/2013 | Vaucher | H01L 39/143 505/166 |
| 2014/0292114 A1 | * | 10/2014 | Bell | H02K 33/16 310/23 |
| 2015/0048695 A1 | * | 2/2015 | Stoltenberg | H02K 16/00 310/23 |

\* cited by examiner

*Primary Examiner* — Thanh Lam
(74) *Attorney, Agent, or Firm* — J. Nevin Shaffer, Jr.

(57) ABSTRACT

An improved hybrid magnetic engine/generator apparatus and method includes a shaft. A pair of oppositely positioned ferrous metal arms is connected to the shaft where the ferrous metal arms include a first end and a second end. Wire is wrapped in non-overlapping fashion around the ferrous metal arms and the wire includes a positive power connection and a negative power connection. A power source is connected with positive power connection and the negative power connection. A stacking magnet is located at the second end of the ferrous metal arms and an opposing magnet is located opposite from and in proximity to the first end of both of the oppositely positioned ferrous metal arms. A device for selectively connecting with the power source is provided such that the wire is intermittently charged such that polarity at the first end of the ferrous metal arms is intermittently changed.

20 Claims, 3 Drawing Sheets

HYBRID MAGNETIC ENGINE/GENERATOR APPARATUS AND METHOD

CROSS REFERENCE TO RELATED APPLICATION

This application claims the benefit of previously filed U.S. provisional patent application No. 61/978,386 filed Apr. 11, 2014 for an "Improved Hybrid Magnetic Engine/Generator Apparatus and Method". The Applicant hereby claims the benefit of this provisional application under 35 U.S.C. §119. The entire content of this provisional application is incorporated herein by this reference.

FIELD OF THE INVENTION

This invention relates to an improved magnetic engine/generator device. In particular, in accordance with one embodiment, the invention relates to an improved hybrid magnetic engine/generator apparatus including a shaft. A pair of oppositely positioned ferrous metal arms is connected to the shaft where the ferrous metal arms include a first end and a second end. Wire is wrapped in non-overlapping fashion around the ferrous metal arms and the wire includes a positive power connection and a negative power connection. A power source is connected with positive power connection and the negative power connection. A stacking magnet is located at the second end of the ferrous metal arms and an opposing magnet is located opposite from and in proximity to the first end of both of the oppositely positioned ferrous metal arms. A device for selectively connecting with the power source is provided such that the wire is intermittently charged such that polarity at the first end of the ferrous metal arms is intermittently changed.

BACKGROUND OF THE INVENTION

A problem exists with regard to the use of magnets in machines used for engines and/or generators. The problem is that the prior art magnetic engine/generator devices are not efficient enough or powerful enough to be truly useful in either commercial or individual settings.

Thus, there is a need in the art for an apparatus and method for providing a magnetic engine and/or generator that is efficient and powerful enough to be useful in any setting, commercial or otherwise.

It therefore is an object of this invention to provide an improved magnetic engine/generator that is efficient and powerful and scalable. It is a further object to provide an improved magnetic engine/generator that is easily adjustable to provide a wide range of functionality.

SUMMARY OF THE INVENTION

Accordingly, the improved hybrid magnetic engine/generator of the present invention, according to one embodiment, includes a shaft. A pair of oppositely positioned ferrous metal arms is connected to the shaft where the ferrous metal arms include a first end and a second end. Wire is wrapped in non-overlapping fashion around the ferrous metal arms and the wire includes a positive power connection and a negative power connection. A power source is connected with positive power connection and the negative power connection. A stacking magnet is located at the second end of the ferrous metal arms and an opposing magnet is located opposite from and in proximity to the first end of both of the oppositely positioned ferrous metal arms. A device for selectively connecting with the power source is provided such that the wire is intermittently charged such that polarity at the first end of the ferrous metal arms is intermittently changed.

All terms used herein are given their common meaning so that "shaft" identifies and describes an extended structure, typically round with a uniform diameter along its length. Further, when it is said that the opposing magnet is located "opposite from and in close proximity to" the first end of the ferrous metal arms, a location is described that is close but not touching the first end when the first end is opposite from the opposing magnet.

Additionally, the terms "opposing magnet" and "stacking magnet" describe magnets located at different places in the structure of the present invention. Thus, the "stacking magnet" of the present invention is located, preferably and by way of example only and not by limitation, at the second end of the ferrous metal arms, as described and illustrated more fully hereafter. The "opposing magnet" of the present invention describes a magnet that is preferably, again, and not by way of limitation, located in close proximity opposite from the first end of the ferrous and, when present, non-ferrous metal arms.

According to another aspect of the invention, the opposing magnet is many times more powerful than the stacking magnet. Thus for example only and not by way of limitation if the stacking magnet has a Push-Pull force ("PPF") of 100 lbs. the PPF of the opposing magnet may be 1200, all as will be more fully described hereafter.

In one aspect, three pairs of oppositely positioned ferrous metal arms are connected to the shaft and in a further aspect, the stacking magnets and the opposing magnets are rare earth magnets.

In another aspect, the apparatus includes a pair of oppositely positioned non-ferrous metal arms connected with the shaft where the non-ferrous metal arms include a first end and a second end and where the a pair of oppositely positioned non-ferrous metal arms is connected with the shaft a longitudinal distance along the shaft from the pair of oppositely positioned ferrous metal arms. (This means that the non-ferrous metal arms are a separate structure that is spaced apart by some section of the shaft from the location of the ferrous metal arm structure on the shaft.) Wire is wrapped in non-overlapping fashion around the non-ferrous metal arms and an opposing magnet is located opposite from and in proximity to the first end of both of the oppositely positioned non-ferrous metal arms. A device for selectively receiving power from the pair of oppositely positioned non-ferrous metal arms is provided. Thus, this structure describes the generator aspect of the present invention in combination with the engine aspect described above.

The term "non-ferrous metal" as used herein describes an arm that not affected by the presence of a magnet. Thus, such a "non-ferrous metal" arm may be made of plastic for example only.

In one aspect, the device for selectively connecting with the power source such that the wire is intermittently charged such that polarity at the first end of the ferrous metal arms is intermittently changed comprises a commutator attached to the shaft and connected with the power source and a brush connected with the pair of oppositely positioned ferrous metal arms wherein as the shaft rotates the brush intermittently contacts the commutator and power transfers from the commutator to the brush and, of course, to the ferrous metal arms. The terms "commutator" and "brush" are used to describe power transfer devices well known by those of ordinary skill in the art and are not described more fully hereafter.

In another aspect, the device for selectively receiving power from the pair of oppositely positioned non-ferrous metal arms comprises a commutator attached to the shaft and a brush connected with the pair of oppositely positioned non-ferrous metal arms where as the shaft rotates the brush intermittently contacts the commutator and power transfers from the brush to the commutator. Here, again, this describes the generator side, as opposed to the engine side describe above, of the present invention.

In a further aspect, three pairs of oppositely positioned ferrous metal arms are connected to the shaft where the ferrous metal arms include a first end and a second end and an opposing magnet is located opposite from and in proximity to the first end of each of the ferrous metal arms where the polarity of the opposing magnets facing the first end is alternated one after the other from north to south.

In another aspect, three pairs of oppositely positioned non-ferrous metal arms are connected to the shaft where the non-ferrous metal arms include a first end and a second end and an opposing magnet located opposite from and in proximity to the first end of less than all of the non-ferrous metal arms. Here this contrasts with the engine side where an opposing magnet is provided for each ferrous metal arm, again as will be more fully described hereafter. Additionally, in one aspect, the ferrous metal arms are longer than the non-ferrous metal arms. In either of these two aspects, the engine side is structured to more easily overcome any resistance on the generator side.

According to another embodiment of the present invention, an improved hybrid magnetic engine/generator apparatus includes a shaft. Three pairs of oppositely positioned ferrous metal arms are connected to the shaft where the ferrous metal arms include a first end and a second end. Wire is wrapped in non-overlapping fashion around the ferrous metal arms where the wire includes a positive power connection and a negative power connection. A power source is connected with the positive power connection and the negative power connection. A stacking magnet is located at the second end of the ferrous metal arms and an opposing magnet is located opposite from and in proximity to the first end of each ferrous metal arm. A device is provided for selectively connecting with the power source such that the wire is intermittently charged such that polarity at the first end of the ferrous metal arms is intermittently changed. Further, three pairs of oppositely positioned non-ferrous metal arms are connected with the shaft. The non-ferrous metal arms include a first end and a second end and the three pairs of oppositely positioned non-ferrous metal arms are connected with the shaft a longitudinal distance along the shaft separate and apart from the three pairs of oppositely positioned ferrous metal arms. Wire is wrapped in non-overlapping fashion around said non-ferrous metal arms and an opposing magnet located opposite from and in proximity to the first end of at least some of the non-ferrous metal arms. No stacking magnet is provided in this embodiment but a device for selectively receiving power from the pair of oppositely positioned non-ferrous metal arms is provided.

In other separate aspects, the opposing magnet is many times more powerful than the stacking magnet; the stacking magnets and the opposing magnets are rare earth magnets; the ferrous metal arms are longer than the non-ferrous metal arms; an opposing magnet is located opposite from and in proximity to the first end of less than all of the non-ferrous metal arms; and the polarity of the opposing magnets facing the ferrous metal arms is alternated one after the other from north to south.

According to another embodiment of the present invention, an improved hybrid magnetic engine/generator method consists of:

a. providing a shaft; three pairs of oppositely positioned ferrous metal arms connected to the shaft where the ferrous metal arms include a first end and a second end; wire wrapped in non-overlapping fashion around the ferrous metal arms where the wire includes a positive power connection and a negative power connection; a power source connected with the positive power connection and the negative power connection; a stacking magnet at the second end of the ferrous metal arms; an opposing magnet located opposite from and in proximity to the first end of each ferrous metal arm; a device for selectively connecting with the power source such that the wire is intermittently charged such that polarity at the first end of the ferrous metal arms is intermittently changed; three pairs of oppositely positioned non-ferrous metal arms connected with the shaft where the non-ferrous metal arms include a first end and a second end, where the three pairs of oppositely positioned non-ferrous metal arms are connected with the shaft a longitudinal distance along the shaft from the three pairs of oppositely positioned ferrous metal arms; wire wrapped in non-overlapping fashion around the non-ferrous metal arms; an opposing magnet located opposite from and in proximity to the first end of at least some of the non-ferrous metal arms; and a device for selectively receiving power from the pair of oppositely positioned non-ferrous metal arms; and b. activating the power source.

In a further aspect of the method, the stacking magnets and the opposing magnets are rare earth magnets and the opposing magnets are many times more powerful than the stacking magnets.

Another aspect further includes the step of adding additional opposing magnets.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
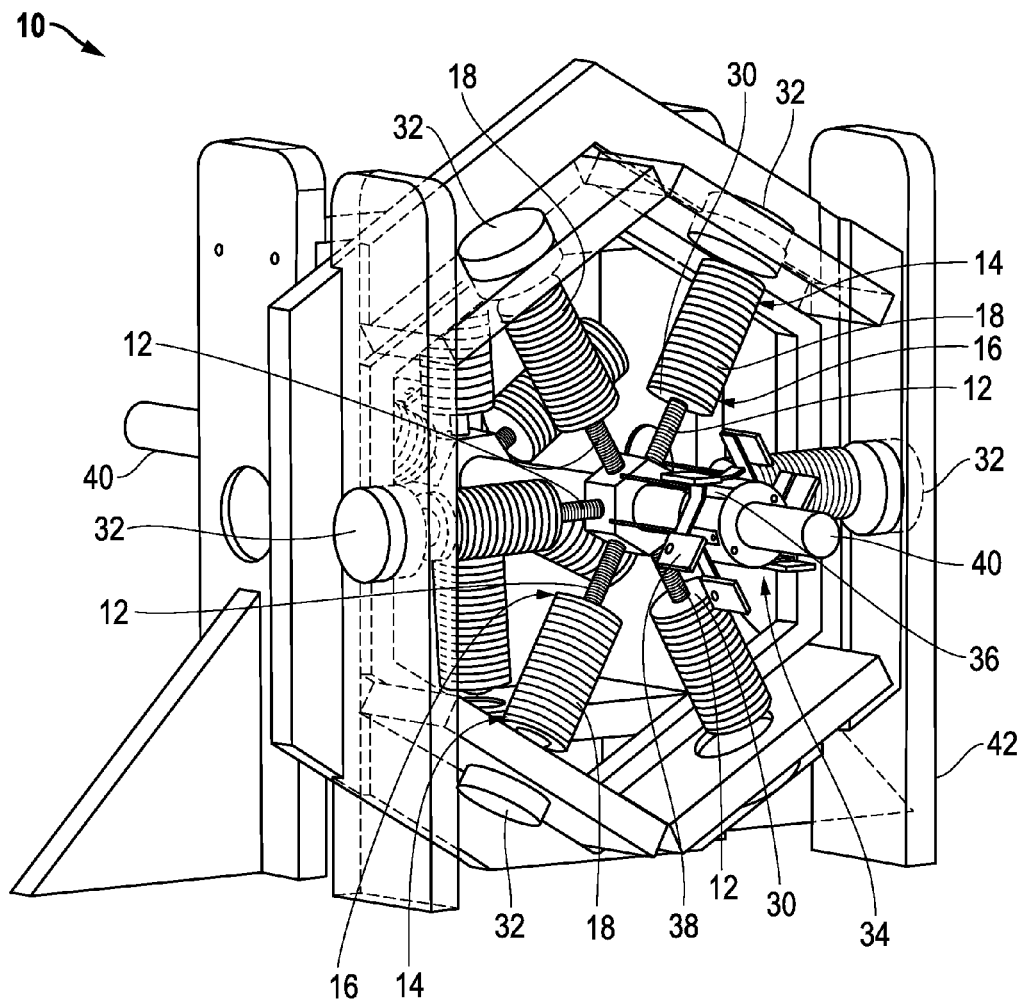
FIG. 1 is a side, partial see through view, of the hybrid magnetic engine/generator of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
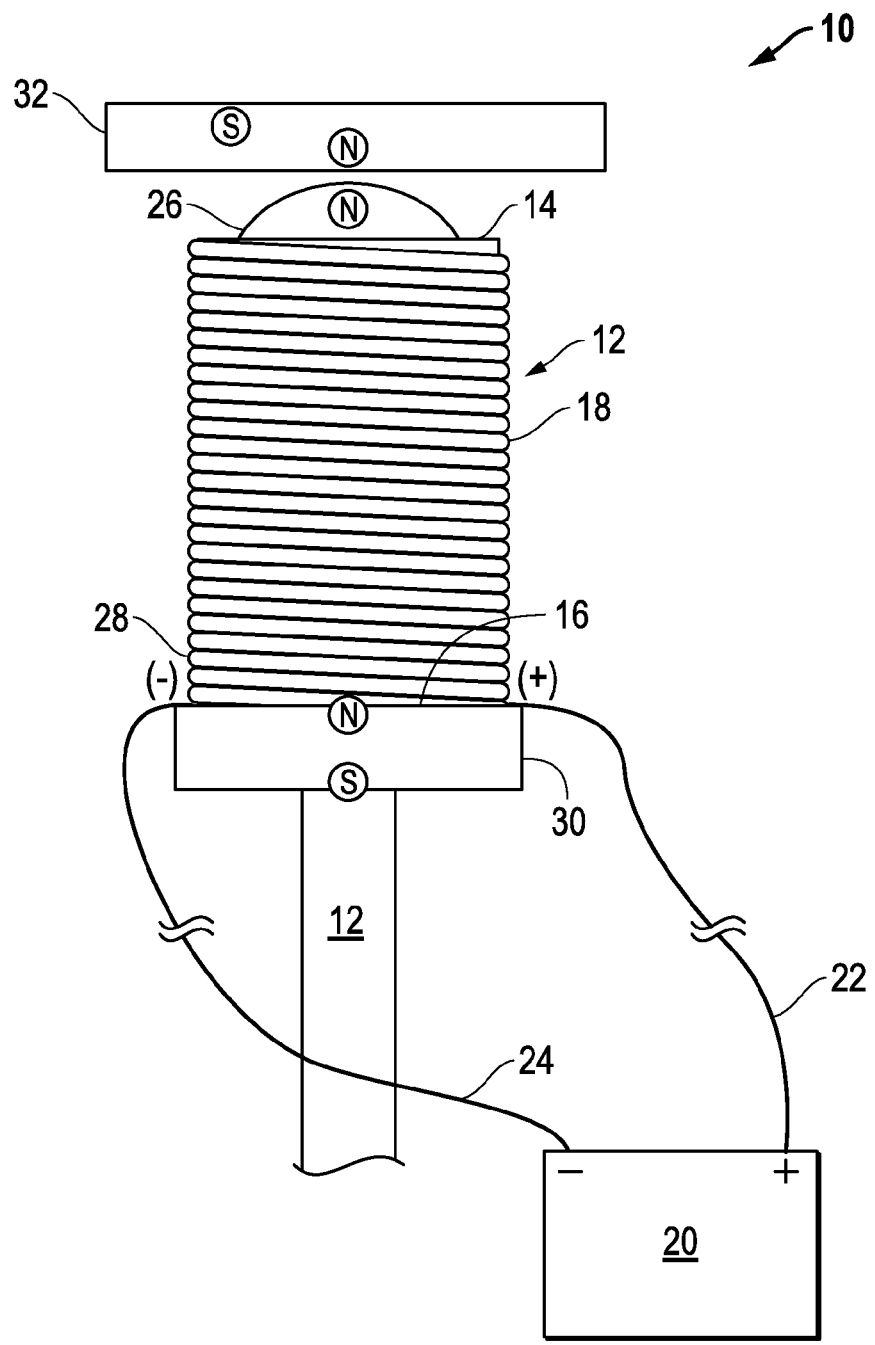
FIG. 2 is a close up view of the opposing magnet, the stacking magnet and the wire wrapped arm of the invention of FIG. 1.
Figure 3:
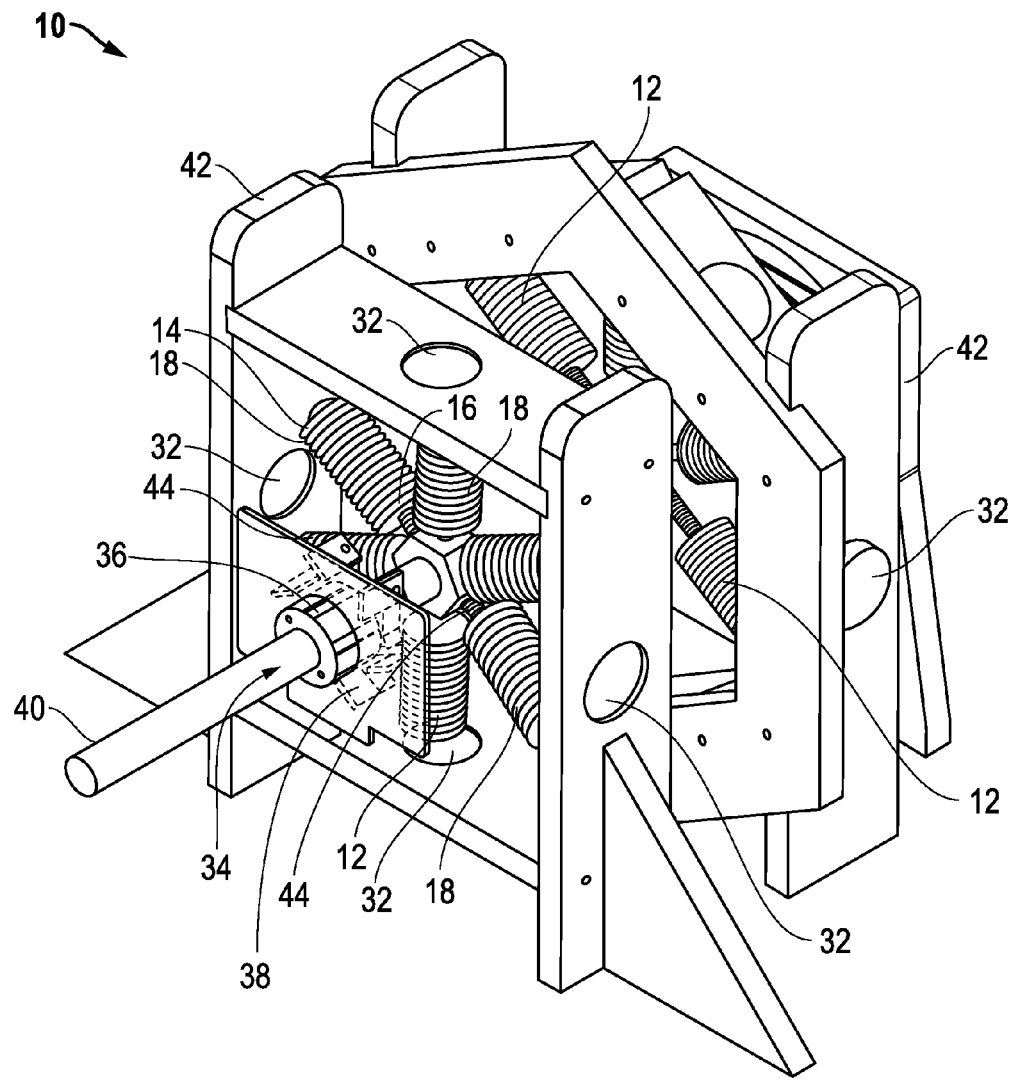
FIG. 3 is a perspective view of the invention of FIG. 1 shown from the generator end.

A preferred embodiment of the present invention is illustrated by way of example in FIGS. 1-3. With specific reference to FIGS. 1 and 2, an improved hybrid magnetic engine/generator 10 includes an arm 12. According to function, arm 12 may be made of ferrous metal or of non-ferrous metal as will be described more fully hereafter. Arm 12 includes a first end 14 and a second end 16. Wire 18 is wrapped around arm 12 as illustrated. Importantly, in order to function as preferred, wire 18 should be wrapped in non-overlapping fashion around arm 12.

As most clearly shown in FIG. 2, power source 20 is provided. Power source 20 may be a battery or any power source now known or hereafter developed. Power source 20 includes a positive power connection 22 and a negative power connection 24. Likewise a positive power connection 22 and a negative power connection 24 is provided at wire 18 wrapped around a ferrous metal arm 12. Depending on the direction current is introduced to the wire 18, either a north pole 26 or a south pole 28 is created at the first end 14 of arm 12 as will be described more fully hereafter.

Still referring specifically to FIG. 2, stacking magnet 30 is added at or in proximity to the second end 16 of arm 12 as illustrated. Opposing magnet 32 is located close to or in proximity to the first end 14 of arm 12 as shown. Preferably, again, opposing magnet 32 is many times more powerful, has much more PPF, than stacking magnet 30. For purposes of example only, the PPF of the stacking magnet 30 may be 300 lbs. while the PPF of the opposing magnet may be 1200 lbs. When energized the wire coil 18 creates a PPF but a small one compared to the magnets, for example 100 lbs. As a result of this large difference in PPF the opposing magnet 32 overpowers the polarity of the stacking magnet 30 when no power is supplied to wire 18. Thus, for example, when the opposing magnet 32 is positioned such that a north pole 26 faces the first end 14 of arm 12, the first end 12 turns into a south pole 28. However, as illustrated in FIG. 2, when power is supplied to wire 18 the polarity of the first end 12 is turned into a north pole 26. This results in opposing north poles 26 facing each other and results in a repulsive force. In this example, when energized, the combined PPF of the wire wrapped ferrous metal arm 12 (100 lbs at both end of the oppositely positioned arms 12) plus the PPF of the two opposing magnets 32 (1200 lbs in proximity to both first ends 14 of the oppositely positioned arms 12) creates a total PPF of 2600 lbs.

Similarly, when there are more than one pair of oppositely positioned ferrous metal arms 12, this effect occurs at each location of the opposing magnet 32. In such a case, as illustrated, the opposing magnets 32 are positioned with alternating poles facing the first end 14. Where three pairs of oppositely positioned arms 12 (or a total of six separate arms 12) are provided, as shown in FIGS. 1 and 3, the PPF is multiplied by three for a total of 7800 lbs and this happens every ⅙ th of a revolution, in this example, for a total of 46,800 lbs PPF per revolution.

The requirement of the structure of the present invention is that it include a device 34 for selectively connecting with the power source 20 such that the wire 18 on ferrous metal arm 12 is intermittently charged such that polarity at the first end 14 of the ferrous metal arm 12 intermittently changed. Device 34 may be any device now known or hereafter developed such as a combination of a commutator 36 and brush 38 device, as are known in the art and illustrated herein, or device 34 may use semi-conductors and consist of a brush-less device 34, as is also known and not described more fully hereafter. In any event the objective and the result is the same such that the provision of device 34 selectively reverses current direction in the wire 18 which is rotating on arm 12 thus providing a force, torque.

This torque is applied through arms 12 to shaft 40, causing shaft 40 to rotate. Shaft 40 is suspended by bearings or the like, not shown, in the middle of structure 42 for example only. Structure 42 suspends opposing magnets 32 is proper location in close proximity to the first ends 14 of arms 12, as illustrated.

FIG. 1 illustrates another feature of the invention in that more than one opposing magnet 32 may be connected at each location. Applicant has found by experimentation that the addition of even two additional opposing magnets 32 (one at each end of one pair of oppositely positioned ferrous metal arms 12) greatly enhances the performance of the invention. In one test, a particular assembly used 4.5 amps to turn the shaft 40 at 6,000 rpms. Adding just two additional opposing magnets 32 similar in PPF to those already in position, reduced the amps required to 4.1 amps and the shaft turned at 6,300 rpms. Similar results were observed with the addition of each additional pair of opposing magnets 32.

Referring now to FIG. 3, other elements and structure of the present invention are described. According to a preferred embodiment a pair of oppositely positioned non-ferrous metal arms 44 are also connected with shaft 40. Non-ferrous metal arms 44 include a first end 14 and a second end 16, as do ferrous metal arms 12. As required by the invention and illustrated, the pair of oppositely positioned non-ferrous metal arms 44 is connected with shaft 40 a longitudinal distance along the shaft 40 and thus is located apart and separate from the pair of oppositely positioned ferrous metal arms 12. Importantly, again, arms 44 are non-ferrous metal arms meaning they can be any material not affected by the presence of a magnetic field.

Wire 18 is wrapped as before in non-overlapping fashion around the non-ferrous metal arms 44. Likewise an opposing magnet 32 is located opposite from and in proximity to the first end 14 of both of the oppositely positioned non-ferrous metal arms 44. Importantly, no stacking magnet 30 is required on the generator side on arms 44.

It should be understood that arms 44 are made of non-ferrous material in order to reduce or eliminate and resistance to their rotation past opposing magnets 32. In other embodiments, in order to reduce possible resistance, where, as illustrated, for example there are more than one pair of arms 44 (three pairs or six separate arms 44 are illustrated) opposing magnets 32 will not be positioned at each first end 14 as has been described above and is illustrated for ferrous metal arms 12. Thus, as shown in FIGS. 1 and 3, where six arms 44 are present at least some but something less than six opposing magnets 32 are used. The figures show four opposing magnets 32 in position at the first ends 14 of four arms 44, for example only and not by limitation.

In another aspect, the resistance may be overcome substantially by providing ferrous metal arms 12 that are longer, as illustrated in FIGS. 1 and 3, thus increasing torque. Applicant has found that an arm 12 that is approximately twenty percent longer than arm 44 is most useful in this situation.

Using the numbers in the example above, on the "generator side" as illustrated, there are four rare earth opposing magnets 32. They produce a resistance of 2,600 lbs PPF, six separate/individual times. Again, FIG. 3 shows there are six coils, wire wrapped non-ferrous metal arms 44, but only two are resisting at a time. This structure enables the hybrid magnetic engine side to easily overcome the initial resistance of 2,600 lbs PPF of the generator side with the 7,800 lbs of PPF per one sixth revolution of the "engine" as described above.

Additionally, in this embodiment, a device 34 for selectively receiving power from the pair of oppositely positioned non-ferrous metal arms 44 is provided. Here the operation of device 34 is the opposite of that described above with regard to the "engine" side of the invention in which power is added. In this instance, device 34 is used to receive power generated by the rotation of arms 44 wrapped in wire 18, preferably, for example, copper wire, past opposing magnets 32.

By way of further description, Applicant has observed that the engine side uses the stored energy of the rare earth opposing magnets 32 to generate far more energy than it consumes so long as the magnets remain charged. At the same time, the generator side consumes no electric energy but only produces energy.

In operation, when power source 20 is connected by means of device 34, the Applicant has observed that only approximately twenty-one and one-half percent of the energy that is produced is consumed. Further, as described above, at any time you desire more power, you simply add additional opposing magnets 32. By way of explanation, when assembled as described herein, when twelve opposing magnets 32, two per arm 12 as illustrated, repulse against the arms 12, an approximate five to one power gain is observed. In this example, 15,600 lbs of PPF are produced every one-sixth of a turn.

Certainly, the smooth operation of the present invention requires that the device 34 add and restrict power precisely. Power is best applied at the moment the first end 14 of arms 12 are very nearly at the center of an opposing magnet 32. If the opposing magnet 32 presents a north pole 26, device 34 ensures that the application of power creates a north pole 26 as well such that repulsion results. Likewise, device 34 ensures that when opposing magnet 32 presents a south pole 28, the application of power creates a south pole 28 in the first end 14 of ferrous metal arm 12 and alternating each successive opposing magnet 32.

Further, once arm 12 is approximately half way in between opposing magnets 32, power is removed from arms 12. Then ferrous metal arm 12 simply becomes a ferrous metal bar that is attracted by the upcoming opposing magnet 32 and is pulled toward it.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An improved hybrid magnetic engine/generator apparatus comprising:
   a. a shaft;
   b. a pair of oppositely positioned ferrous metal arms connected to said shaft wherein said ferrous metal arms include a first end and a second end;
   c. wire wrapped in non-overlapping fashion around said ferrous metal arms wherein said wire includes a positive power connection and a negative power connection;
   d. a power source connected with said positive power connection and said negative power connection;
   e. a stacking magnet at said second end of said ferrous metal arms;
   f. an opposing magnet located opposite from and in proximity to said first end of both of said oppositely positioned ferrous metal arms; and
   g. a device for selectively connecting with said power source such that said wire is intermittently charged such that polarity at the first end of said ferrous metal arms is intermittently changed.

2. The apparatus of claim 1 wherein the opposing magnet is many times more powerful than said stacking magnet.

3. The apparatus of claim 1 wherein three pairs of oppositely positioned ferrous metal arms are connected to said shaft.

4. The apparatus of claim 1 wherein the stacking magnets and the opposing magnets are rare earth magnets.

5. The apparatus of claim 1 further comprising:
   a. a pair of oppositely positioned non-ferrous metal arms connected with said shaft wherein said non-ferrous metal arms include a first end and a second end, wherein said a pair of oppositely positioned non-ferrous metal arms is connected with said shaft a longitudinal distance along said shaft from said pair of oppositely positioned ferrous metal arms;
   b. wire wrapped in non-overlapping fashion around said non-ferrous metal arms;
   c. an opposing magnet located opposite from and in proximity to said first end of both of said oppositely positioned non-ferrous metal arms; and
   d. a device for selectively receiving power from said pair of oppositely positioned non-ferrous metal arms.

6. The apparatus of claim 1 wherein said device for selectively connecting with said power source such that said wire is intermittently charged such that polarity at the first end of said ferrous metal arms is intermittently changed comprises a commutator attached to said shaft and connected with said power source and a brush connected with said pair of oppositely positioned ferrous metal arms wherein as said shaft rotates said brush intermittently contacts said commutator and power transfers from said commutator to said brush.

7. The apparatus of claim 5 wherein said device for selectively receiving power from said pair of oppositely positioned non-ferrous metal arms comprises a commutator attached to said shaft and a brush connected with said pair of oppositely positioned non-ferrous metal arms wherein as said shaft rotates said brush intermittently contacts said commutator and power transfers from said brush to said commutator.

8. The apparatus of claim 5 wherein said wire is copper wire.

9. The apparatus of claim 1 further comprising:
   a. three pairs of oppositely positioned ferrous metal arms connected to said shaft wherein said ferrous metal arms include a first end and a second end; and
   b. an opposing magnet located opposite from and in proximity to said first end of each of the ferrous metal arms wherein the polarity of the opposing magnets facing said first end is alternated one after the other from north to south.

10. The apparatus of claim 5 further comprising:
    a. three pairs of oppositely positioned non-ferrous metal arms connected to said shaft wherein said non-ferrous metal arms include a first end and a second end; and
    b. an opposing magnet located opposite from and in proximity to said first end of less than all of said non-ferrous metal arms.

11. The apparatus of claim 5 wherein the ferrous metal arms are longer than the non-ferrous metal arms.

12. An improved hybrid magnetic engine/generator apparatus comprising:
    a. a shaft;
    b. three pairs of oppositely positioned ferrous metal arms connected to said shaft wherein said ferrous metal arms include a first end and a second end;
    c. wire wrapped in non-overlapping fashion around said ferrous metal arms wherein said wire includes a positive power connection and a negative power connection;
    d. a power source connected with said positive power connection and said negative power connection;
    e. a stacking magnet at said second end of said ferrous metal arms;
    f. an opposing magnet located opposite from and in proximity to said first end of each ferrous metal arm;
    g. a device for selectively connecting with said power source such that said wire is intermittently charged such that polarity at the first end of said ferrous metal arms is intermittently changed;
    h. three pairs of oppositely positioned non-ferrous metal arms connected with said shaft wherein said non-ferrous metal arms include a first end and a second end, wherein said three pairs of oppositely positioned non-ferrous metal arms are connected with said shaft a longitudinal distance along said shaft from said three pairs of oppositely positioned ferrous metal arms;
    i. wire wrapped in non-overlapping fashion around said non-ferrous metal arms;
    j. an opposing magnet located opposite from and in proximity to said first end of at least some of said non-ferrous metal arms; and
    d. a device for selectively receiving power from said pair of oppositely positioned non-ferrous metal arms.

13. The apparatus of claim 12 wherein the opposing magnet is many times more powerful than said stacking magnet.

14. The apparatus of claim 12 wherein the stacking magnets and the opposing magnets are rare earth magnets.

15. The apparatus of claim 12 wherein the ferrous metal arms are longer than the non-ferrous metal arms.

16. The apparatus of claim 12 wherein an opposing magnet is located opposite from and in proximity to said first end of less than all of said non-ferrous metal arms.

17. The apparatus of claim 12 wherein the polarity of the opposing magnets facing said ferrous metal arms is alternated one after the other from north to south.

18. An improved hybrid magnetic engine/generator method comprising:
    a. providing a shaft; three pairs of oppositely positioned ferrous metal arms connected to said shaft wherein said ferrous metal arms include a first end and a second end; wire wrapped in non-overlapping fashion around said ferrous metal arms wherein said wire includes a positive power connection and a negative power connection; a power source connected with said positive power connection and said negative power connection; a stacking magnet at said second end of said ferrous metal arms; an opposing magnet located opposite from and in proximity to said first end of each ferrous metal arm; a device for selectively connecting with said power source such that said wire is intermittently charged such that polarity at the first end of said ferrous metal arms is intermittently changed; three pairs of oppositely positioned non-ferrous metal arms connected with said shaft wherein said non-ferrous metal arms include a first end and a second end, wherein said three pairs of oppositely positioned non-ferrous metal arms are connected with said shaft a longitudinal distance along said shaft from said three pairs of oppositely positioned ferrous metal arms; wire wrapped in non-overlapping fashion around said non-ferrous metal arms; an opposing magnet located opposite from and in proximity to said first end of at least some of said non-ferrous metal arms; and a device for selectively receiving power from said pair of oppositely positioned non-ferrous metal arms; and
    b. activating said power source.

19. The method of claim 18 wherein the stacking magnets and the opposing magnets are rare earth magnets and wherein the opposing magnets are many times more powerful than said stacking magnets.

20. The method of claim 18 further including the step of adding additional opposing magnets.

* * * * *